(12) United States Patent
Landais et al.

(10) Patent No.: US 11,650,866 B2
(45) Date of Patent: May 16, 2023

(54) NOTIFICATIONS SENT WITH INDIRECT COMMUNICATION IN SBA

(71) Applicant: NOKIA TECHNOLOGIES OY, Espoo (FI)

(72) Inventors: Bruno Landais, Pleumeur-Bodou (FR); Thomas Belling, Erding (DE); Nagendra Bykampadi, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/164,455

(22) Filed: Feb. 1, 2021

(65) Prior Publication Data

US 2021/0240554 A1 Aug. 5, 2021

(30) Foreign Application Priority Data

Feb. 4, 2020 (IN) .............................. 202041004918

(51) Int. Cl.
*G06F 3/00* (2006.01)
*G06F 9/54* (2006.01)

(52) U.S. Cl.
CPC .............. *G06F 9/542* (2013.01); *G06F 9/541* (2013.01)

(58) Field of Classification Search
CPC ........................................................ G06F 9/541
USPC ....................................................... 719/328
See application file for complete search history.

(56) References Cited

U.S. PATENT DOCUMENTS

| | | | | |
|---|---|---|---|---|
| 6,631,363 B1* | 10/2003 | Brown | ..................... | G06F 9/542 370/401 |
| 6,748,555 B1* | 6/2004 | Teegan | ................ | G06F 11/3409 714/38.12 |
| 10,769,000 B1* | 9/2020 | Plunk | ..................... | G06F 9/541 |
| 10,791,044 B1* | 9/2020 | Krishan | ................. | H04L 43/50 |
| 2002/0026478 A1* | 2/2002 | Rodgers | ..................... | G06F 8/65 709/205 |
| 2011/0158132 A1* | 6/2011 | Robbins | ................. | H04M 11/04 370/352 |
| 2012/0005319 A1* | 1/2012 | McDougal | .............. | H04W 4/50 709/221 |
| 2014/0164479 A1* | 6/2014 | Vano Newman | ... | H04L 67/2804 709/203 |

(Continued)

FOREIGN PATENT DOCUMENTS

| | | | | |
|---|---|---|---|---|
| JP | 2016533062 A | * | 12/2001 | ......... G06F 16/9535 |
| KR | 20090036456 A | * | 4/2009 | |

(Continued)

OTHER PUBLICATIONS

Lukasz Wesolowski, An Application Programming Interface for General Purpose Graphics Processing Units in an Asynchronous Runtime System. (Year: 2008).*

Giovanni Bartolomeo, SMILE-JS, a SIP-based Middleware for J2ME Devices. (Year: 2006).*

(Continued)

*Primary Examiner* — Lechi Truong

(74) *Attorney, Agent, or Firm* — Alston & Bird LLP

(57) ABSTRACT

A method, apparatus, and computer program product relating to notification requests and callback requests in indirect communications are provided. In the context of a method, the method includes sending a service request for selection of a service consumer. The service request is one of a notification request or a callback request. The method further includes indicating a version of a programming interface configured to support the service request.

17 Claims, 15 Drawing Sheets

(56) References Cited

U.S. PATENT DOCUMENTS

| | | | | |
|---|---|---|---|---|
| 2015/0058444 | A1* | 2/2015 | Willmann | H04L 67/18 709/217 |
| 2017/0161059 | A1* | 6/2017 | Wood | G06F 9/45558 |
| 2020/0106840 | A1 | 4/2020 | Liu et al. | |
| 2022/0385735 | A1* | 12/2022 | Yang | H04L 63/168 |

FOREIGN PATENT DOCUMENTS

| | | | | |
|---|---|---|---|---|
| WO | WO-0198904 | A1 * | 12/2001 | G06F 16/9535 |
| WO | WO 0198904 | A1 | 12/2001 | |
| WO | WO 2018/219343 | A1 | 12/2018 | |

OTHER PUBLICATIONS

Xinxin Hu, Signalling Security Analysis: Is HTTP/2 Secure in 5G Core Network? (Year: 2018).*

"3rd Generation Partnership Project; Technical Specification Group Core Network and Terminals; 5G System; Technical Realization of Service Based Architecture; Stage 3 (Release 16)", 3GPP TS 29.500 v16.2.1 (Jan. 2020), 50 pages.

"3rd Generation Partnership Project; Technical Specification Group Services and System Aspects; System architecture for the 5G System (5GS); Stage 2 (Release 16)" 3GPP TS 23.501 v16.3.0 (Dec. 2019), 417 pages.

"3rd Generation Partnership Project; Technical Specification Group Services and System Aspects; Procedures for the 5G System (5GS); Stage 2 (Release 16)", 3GPP TS 23.502 v16.3.0 (Dec. 2019), 558 pages.

"3rd Generation Partnership Project; Technical Specification Group Core Network and Terminals; 5G System; Public Land Mobile Network (PLMN) Interconnection; Stage 3 (Release 16)" 3GPP TS 29.573 v16.1.0 (Dec. 2019), 79 pages.

"3rd Generation Partnership Project; Technical Specification Group Core Network and Terminals; 5G System; Network Function Repository Services; Stage 3 (Release 16)" 3GPP TS 29.510 v16.2.0 (Dec. 2019), 167 pages.

Ericsson et al., "Binding for Notification Reselection Corrections", 3GPP TSG-SA/WG2 Meeting #136-AH, S2-2001313 (Jan. 13-17, 2020), 6 pages.

Office Action for Chinese Application No. 202110166668.3 dated Dec. 20, 2021, 15 pages.

Nokia et al., "Notifications Sent with Indirect Communication", 3GPP TSG-CT WG4 Meeting #96, C4-201048, (Feb. 24-28, 2020), 5 pages.

Nokia et al., "Handling of Default Notification Subscriptions with Delegated Discovery", 3GPP TSG-CT WG4 Meeting #95, C4-195371, (Nov. 11-15, 2019), 3 pages.

Nokia et al., "Notifications Sent with Indirect Communication", 3GPP TSG-CT WG4 Meeting #96, C4-200524, (Feb. 24-28, 2020), 6 pages.

Office Action for Japanese Application No. 2021-007785 dated Mar. 1, 2022, 12 pages.

"3rd Generation Partnership Project; Technical Specification Group Core Network and Terminals; 5G System; Network Function Repository Services; Stage 3 (Release 15)", 3GPP TS 29.510 v15.3.0, (Mar. 2019), 121 pages.

"3rd Generation Partnership Project; Technical Specification Group Core Network and Terminals; 5G System; Network Function Repository Services; Stage 3 (Release 16)", 3GPP TS 29.510 v16.1.1, (Oct. 2019), 150 pages.

"3rd Generation Partnership Project; Technical Specification Group Services and System Aspects; System Architecture for the 5G System; Stage 2 (Release 16)" 3GPP TS 23.501 v16.2.0 (Sep. 2019), 392 pages.

Ericsson, "Preferred API Version", 3GPP 29.510 Change Request 0266 rev 3, 3GPP TSG-CT WG4 Meeting #95, C4-195602 (Nov. 11-15, 2019), 17 pages.

Extended European Search Report for European Application No. 21152064.8 dated Jun. 28, 2021, 21 pages.

Office Actionfor Chinese Application No. 202110166668.3 dated Jul. 20, 2022, 12 pages.

Decision to Grant for Japanese Application No. 2021-007785 dated Jan. 10, 2023, 6 pages.

* cited by examiner

5.2.3.2.3 3gpp-Sbi-Callback

The header contains the type of notification. The value for the notificaition type is a string used identifing a particular type of callback (e.g. a notification, typically the name of the notify service operation).
The encoding of the header follows the ABNF as defined in IETF RFC 7230 [12].
3gpp-Sbi-Notification header field = "3gpp-Sbi-Callback" ":" OWS cbtype *1( OWS ";" "apiversion=" majorversion)
cbtype = 1*cbchar
cbchar = "-" / "_" / DIGIT / ALPHA
majorversion = *DIGIT
EXAMPLE 1 An example is: 3gpp-Sbi-Callback: Nnrf_NFManagement_NFStatusNotify.
EXAMPLE 2: 3gpp-Sbi-Callback: Nudm_SDM_Notification; apiversion=2
The list of valid values for this header the cbtype is specified in Annex B.
The apiversion parameter should be present if the major version is higher than 1.
NOTE: The apiversion parameter can be used by the SEPP to identify the protection and modification policies applicable to the API version of a notification or callback request, or by the SCP to select a notification endpoint of a NF Service Consumer that supports the API version when forwarding a notification request issued for a default notification subscription.

Fig. 3

6.5.3.2 Stateless NF as service consumer

1. When the NF service consumer subscribes to notifications from another NF service producer, the NF service consumer may provide a binding indication to the NF service producer as specified in clause 6.3.1.0 of 3GPP TS 23.501 [3] and clause 4.17.12.4 of 3GPP TS 23.502 [4], to enable the related notifications to be sent to an alternative NF within the NF set, in addition to providing the Callback URI in the subscription resource.

2. A NF service producer or SCP may use the Nnrf_NFDiscovery service to discover NFs within an NF set.

3. An NF service producer may become aware of a NF service consumer change, via receiving an updated binding information, or via an Error response to a notification, via link level failures (e.g. no response from the NF), or via a notification from the NRF that the NF has deregistered. The HTTP error response may be a 3xx redirect response pointing to a new NF.

4. When becoming aware of an NF service consumer change, and the new NF service consumer is not known, the NF service producer shall select an NF according to the binding indication as specified in clause 6.3.1.0 of 3GPP TS 23.501 [3] and clause 4.17.12.4 of 3GPP TS 23.502 [4].

5. When becoming aware of an NF service consumer change, the NF service producer or SCP shall exchange the authority part of the Notification URI with new NF service consumer information and shall use that URI in subsequent communication.

6. Each NF within the NF set shall be prepared to receive notifications from the NF service producer, by either handling the notification to the Notification URI constructed according to bullet 5 with the own address as authority part, or by replying with an HTTP 3xx redirect pointing to a new NF, or by replying with another HTTP error.

Editor's Note: the behaviour when NFs of an NF Set are not able to receive Notification URI constructed according to bullet 5 is FFS, e.g. regarding how to update the NF producer with a new notification URI and how to handle and reply to an incoming notification request with an unknown URI.

7. The NF service producer shall be prepared to receive updates to resources of the related service from any NF within the set.

Fig. 4

6.10.3.3 Notifications corresponding to default notification subscriptions

An NF may register default notification subscriptions in its NF profile or NF services in the NRF for notifications the NF is prepared to consume, including for each type of notification the corresponding notification endpoint (i.e. callback URI).

NOTE: This can be used e.g. by an AMF to discover the notification endpoint of other AMFs to forward N1 or N2 messages, or by an AMF to notify location information to a GMLC, or by an UDR to nofity data change or removal to an UDM.

The following procedures may be used to support notifications corresponding to default notification subscriptions:

- an NF producer may perform a discovery request towards the NRF (possibly through an SCP) to discover default notification suscriptions of an NF consumer, and if so, send notifications to the corresponding notification endpoints, using routing mechanisms specified in clause 6.1; or

- an NF producer may be configured with the types of notifications corresponding to default notification subscriptions it needs to generate, and send such notifications using delegated discovery, i.e with an SCP discovering and selecting an NF service consumer with a corresponding default notification subscription. To enable the latter, the NF producer shall include in the notification request:

- <u>the 3gpp-Sbi-Callback header including the name of the notify or callback service operation and the API major version if higher than 1;</u>
  - the 3gpp-Sbi-Discovery-notification-type header set to the type of notification being set;
  - the 3gpp-Sbi-Discovery-target-nf-type header indicating the type of the consumer NF;
  - optionally, additional NF service discovery factors header to be used by the SCP to discover and select the consumer NF.

Fig. 5

6.10.x Notification and callback requests sent with Indirect Communication

Notification and callback requests that are sent using indirect communication shall include a 3gpp-Sbi-Callback header including the name of the notify or callback service operation (see Annex B) and the API major version if higher than 1.

The SCP may derive from the presence of this header that a service request is a notification or callback request.

NOTE: This can be used by the SCP to apply differentiated treatments for notification and callback requests compared to other service requests, e.g. for authorization (access token is not used in notification / callback, see clause 6.7.3).

Fig. 6

Annex B (normative):
3gpp-Sbi-Callback Types

This annex specifies the list of allowed 3GPP SBI callback type values for the 3gpp-Sbi-Callback HTTP custom header specified in clause 5.2.3.2.3.
Table B-1 specifies ~~Only the~~ callbacks that are invoked across PLMN ~~are specified~~.

Table B-1: Values for 3gpp-Sbi-Callback Custom HTTP Header

| Value for 3gpp-Sbi-Callback Custom HTTP Header | Reference |
|---|---|
| "Nsmf_PDUSession_Update" | 3GPP TS 29.502 [28], Clause 5.2.2.8.3.2, 5.2.2.8.3.3, 5.2.2.8.3.4 and 5.2.2.8.3.5. |
| "Nsmf_PDUSession_StatusNotify" | 3GPP TS 29.502 [28], Clause 5.2.2.10. |
| "Nudm_SDM_Notification" | 3GPP TS 29.503 [29], Clause 6.1.5.2 |
| "Nudm_UECM_DeregistrationNotification" | 3GPP TS 29.503 [29], Clause 6.2.5.2 |
| "Nudm_UECM_PCSCFRestorationNotification" | 3GPP TS 29.503 [29], Clause 6.2.5.3 |
| "Nnrf_NFManagement_NFStatusNotify" | 3GPP TS 29.510 [8], Clause 6.1.5.2. |
| "Namf_EventExposure_Notify" | 3GPP TS 29.518 [31], Clause 6.2.5.2. |
| "Npcf_UEPolicyControl_UpdateNotify" | 3GPP TS 29.525 [35], Clauses 4.2.4, 5.5.2 and 5.5.3. |
| "Nnssf_NSSAIAvailability_Notification" | 3GPP TS 29.531 [32], Clause 6.2.5.2 |

The 3gpp-Sbi-Callback header shall also be used in notification and callback requests that are sent with indirect communication (see clause 6.10.x).
For notification and callback service operations (used across PLMNs or within a PLMN) that are not part of Table B.1, the value of the header shall be constructed as follows:
"N<NF> <service name> <name of the callback service operation in the corresponding OpenAPI specification file>"
EXAMPLE:    Nsmf_PDUSession_smContextStatusNotification (for the Notify SM Context Status service operation)

Fig. 7

6.1.6.2.4 Type: DefaultNotificationSubscription

Table 6.1.6.2.4-1: Definition of type DefaultNotificationSubscription

| Attribute name | Data type | P | Cardinality | Description |
|---|---|---|---|---|
| notificationType | NotificationType | M | 1 | Type of notification for which the corresponding callback URI is provided. |
| callbackUri | Uri | M | 1 | This attribute contains a default notification endpoint to be used by a NF Service Producer towards an NF Service Consumer that has not registered explicitly a callback URI in the NF Service Producer (e.g. as a result of an implicit subscription). |
| n1MessageClass | N1MessageClass | C | 0..1 | If the notification type is N1_MESSAGES, this IE shall be present and shall identify the class of N1 messages to be notified. |
| n2InformationClass | N2InformationClass | C | 0..1 | If the notification type is N2_INFORMATION, this IE shall be present and shall identify the class of N2 information to be notified. |
| versions | array(string) | O | 1..N | The API versions supported by the NF Service for the default notification type. |

Fig. 8

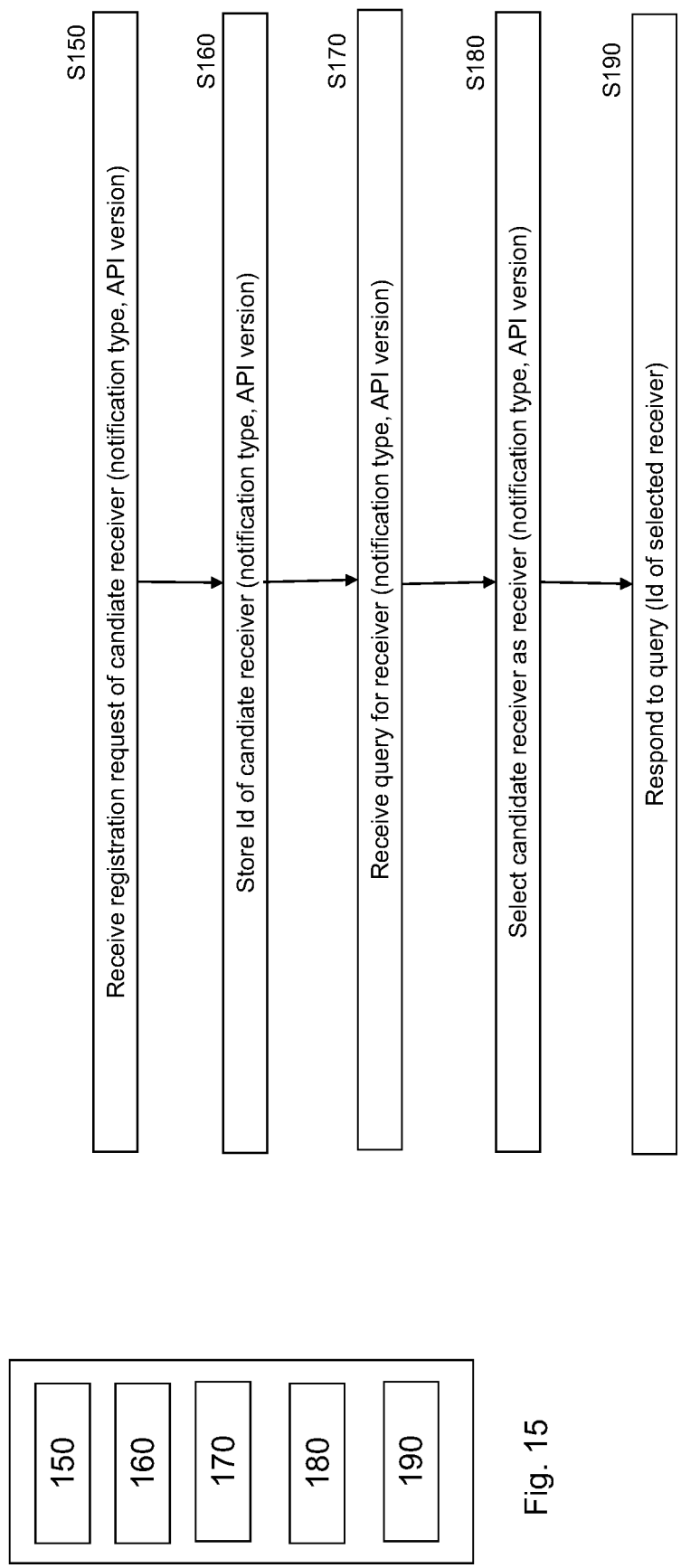

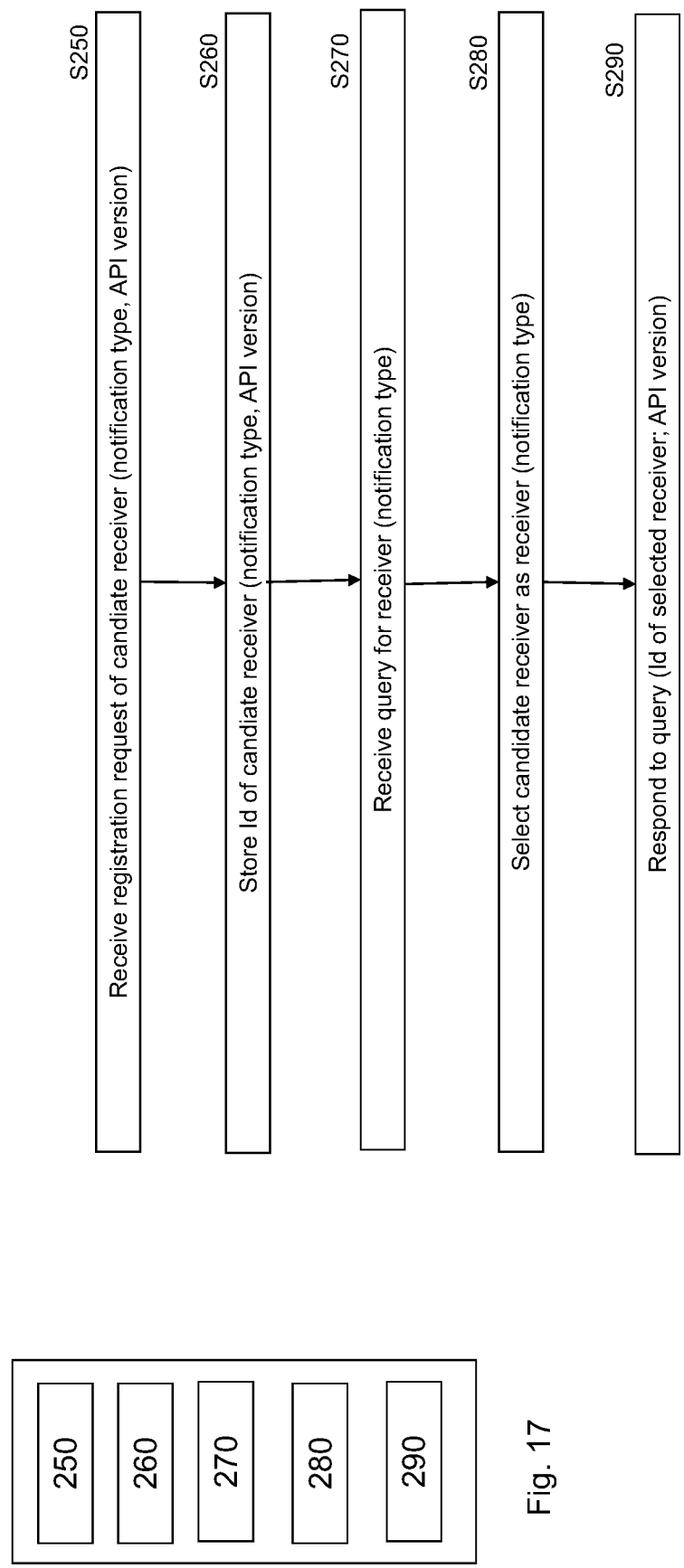

NOTIFICATIONS SENT WITH INDIRECT COMMUNICATION IN SBA

CROSS-REFERENCE TO RELATED APPLICATION

This application claims priority to Indian Application No. 202041004918, filed Feb. 4, 2020, the entire contents of which are incorporated herein by reference.

FIELD OF THE INVENTION

The present invention relates to notification requests and callback requests in indirect communication.

ABBREVIATIONS

3GPP 3$^{rd}$ Generation Partnership Project
5G 5$^{th}$ Generation
API Application Programming Interface
eSBA enhanced SBA
HTTP Hypertext Transfer Protocol
NF Network Function
NRF Network Repository Function
PLMN Public Land Mobile Network
Rel Release
SA System Architecture
SBA Service based Architecture
SBI Service based Interface
SCP Service Communication Proxy
SEPP Security Edge Protection Proxy
TCP Transmission Control Protocol
TS Technical Specification
URI Unified Resource Identifier

BACKGROUND OF THE INVENTION

It is intended that 3GPP SA3 and CT4 will complete their Rel-16 stage 3 work on eSBA (enhanced Service Based Architecture) in Q1 2020. eSBA introduces, among others, the support of indirect communication between a NF Service Consumer and a NF Service Producer via one or more SCPs (Service Communication Proxy). Details on the technical realization of support of Indirect Communication are available in clause 6.10 of 3GPP TS 29.500.

SUMMARY OF THE INVENTION

It is an object of the present invention to improve the prior art.

According to a first aspect of the invention, there is provided an apparatus, comprising means for sending a notification or callback request and indicating in said request a version of a programming interface configured to provide said request.

According to a second aspect of the invention, there is provided an apparatus, comprising means for receiving, on a programming interface of one or multiple interface versions, a notification or callback request of a type; means for requesting, at a database, a registration of the apparatus, of the type of said request, and of said one or multiple versions that said programming interface supports for the notification or callback.

According to a third aspect of the invention, there is provided an apparatus, comprising means for receiving a notification or callback request containing an indication of an interface version of a producer programming interface configured to produce said request; means for selecting a receiver of said request with a programming interface that supports handling said interface version; and means for sending said request to said receiver.

According to a fourth aspect of the invention, there is provided an apparatus, comprising first means for receiving, for each of one or more candidate receivers, a registration request of the respective candidate receiver for receiving, by a respective programming interface, a notification or callback request of a candidate type, wherein the registration request contains an identification of said respective candidate receiver, an indication of the candidate type of said request, and an indication of one or multiple candidate versions the programming interface of said respective candidate receiver is compatible with; means for storing the identification of each of said one or more candidate receivers along with said candidate type and said respective one or multiple candidate versions; second means for receiving a query for an identification of a receiver, wherein the query comprises an indication of a requested type of notification or callback request and an indication of a requested version of a programming interface; means for selecting one or several identifications among the stored one or several identifications of the candidate receivers, wherein, for each of the selected identifications, the respective stored candidate type matches the requested type and one of the respective one or multiple stored candidate versions matches the requested version; means for responding to the query indicating the selected one or several identifications.

According to a fifth aspect of the invention, there is provided an apparatus, comprising first means for receiving, for each of one or more candidate receivers, a registration request of the respective candidate receiver for receiving, by a respective programming interface, a notification or callback request of a candidate type, wherein the registration request contains an identification of said respective candidate receiver, an indication of the candidate type of said request, and an indication of respective one or multiple candidate versions the programming interface of said respective candidate receiver is compatible with; means for storing, for each of the one or more candidate receivers, the identification of said respective candidate receiver along with said candidate type and said respective one or multiple candidate versions; second means for receiving a query for an identification of a receiver, wherein the query comprises an indication of a requested type of notification or callback request; means for selecting one or several identifications among the stored identifications of the candidate receivers, wherein, for each of the selected one or several identifications, the respective stored candidate type matches the requested type; means for responding to the query indicating the one or several selected identifications and, for each of the one or several selected identifications, said one or multiple candidate versions stored along with the respective selected identification.

According to a sixth aspect of the invention, there is provided an apparatus, comprising means for providing, via a communication proxy, a request; wherein the request comprises an indication of the request being one of a callback request and a notification request if, and only if, the request is the callback request and the notification request, respectively.

According to a seventh aspect of the invention, there is provided an apparatus, comprising means for monitoring if a received request comprises a notification indication, wherein the notification indication indicates that the request is one of a callback request and a notification request; means for handling the request as a service request if the request does not comprise the notification indication; means for handling the request as a notification or callback request if the request comprises the notification indication, wherein the handling as a service request is different from the handling as a notification or callback request.

According to an eighth aspect of the invention, there is provided a method, comprising sending a notification or callback request and indicating in said request a version of a programming interface configured to provide said request.

According to a ninth aspect of the invention, there is provided a method, comprising receiving, on a programming interface of one or multiple interface versions, a notification or callback request of a type; requesting, at a database, a registration of an apparatus performing the method, of the type of said request, and of said one or multiple versions that said programming interface supports for the notification or callback.

According to a tenth aspect of the invention, there is provided a method, comprising receiving a notification or callback request containing an indication of an interface version of a producer programming interface configured to produce said request; selecting a receiver of said request with a programming interface that supports handling said interface version; and sending said request to said receiver.

According to an eleventh aspect of the invention, there is provided a method, comprising receiving, for each of one or more candidate receivers, a registration request of the respective candidate receiver for receiving, by a respective programming interface, a notification or callback request of a candidate type, wherein the registration request contains an identification of said respective candidate receiver, an indication of the candidate type of said request, and an indication of one or multiple candidate versions the programming interface of said respective candidate receiver is compatible with; storing the identification of each of said one or more candidate receivers along with said candidate type and said respective one or multiple candidate versions; receiving a query for an identification of a receiver, wherein the query comprises an indication of a requested type of notification or callback request and an indication of a requested version of a programming interface; selecting one or several identifications among the stored one or several identifications of the candidate receivers, wherein, for each of the selected identifications, the respective stored candidate type matches the requested type and one of the respective one or multiple stored candidate versions matches the requested version; responding to the query indicating the selected one or several identifications.

According to a twelfth aspect of the invention, there is provided a method, comprising receiving, for each of one or more candidate receivers, a registration request of the respective candidate receiver for receiving, by a respective programming interface, a notification or callback request of a candidate type, wherein the registration request contains an identification of said respective candidate receiver, an indication of the candidate type of said request, and an indication of respective one or multiple candidate versions the programming interface of said respective candidate receiver is compatible with; storing, for each of the one or more candidate receivers, the identification of said respective candidate receiver along with said candidate type and said respective one or multiple candidate versions; receiving a query for an identification of a receiver, wherein the query comprises an indication of a requested type of notification or callback request; selecting one or several identifications among the stored identifications of the candidate receivers, wherein, for each of the selected one or several identifications, the respective stored candidate type matches the requested type; responding to the query indicating the one or several selected identifications and, for each of the one or several selected identifications, said one or multiple candidate versions stored along with the respective selected identification.

According to a thirteenth aspect of the invention, there is provided a method, comprising providing, via a communication proxy, a request; wherein the request comprises an indication of the request being one of a callback request and a notification request if, and only if, the request is the callback request and the notification request, respectively.

According to a fourteenth aspect of the invention, there is provided a method, comprising monitoring if a received request comprises a notification indication, wherein the notification indication indicates that the request is one of a callback request and a notification request; handling the request as a service request if the request does not comprise the notification indication; handling the request as a notification or callback request if the request comprises the notification indication, wherein the handling as a service request is different from the handling as a notification or callback request.

Each of the methods of the eighth to fourteenth aspects may be a method of indirect communication.

According to a fifteenth aspect of the invention, there is provided a computer program product comprising a set of instructions which, when executed on an apparatus, is configured to cause the apparatus to carry out the method according to any of the eighth to fourteenth aspects. The computer program product may be embodied as a computer-readable medium or directly loadable into a computer.

According to some embodiments of the invention, at least one of the following advantages may be achieved:
Notification requests are appropriately handled in indirect communication;
Notification consumer can surely decode and understand received notifications.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 3 shows a first update of 3GPP TS 29.500 according to some example embodiments of the invention;

FIG. 4 shows a further update of 3GPP TS 29.500 according to some example embodiments of the invention;

FIG. 5 shows a further update of 3GPP TS 29.500 according to some example embodiments of the invention;

FIG. 6 shows a further update of 3GPP TS 29.500 according to some example embodiments of the invention;

FIG. 7 shows a further update of 3GPP TS 29.500 according to some example embodiments of the invention;

FIG. 8 shows an update of 3GPP TS 29.510 according to some example embodiments of the invention;

FIG. 15 shows an apparatus according to an example embodiment of the invention;

FIG. 16 shows a method according to an example embodiment of the invention; and

FIG. 17 shows an apparatus according to an example embodiment of the invention.

FIG. 18 shows a method according to an example embodiment of the invention;

DETAILED DESCRIPTION OF CERTAIN EMBODIMENTS

Figure 1:
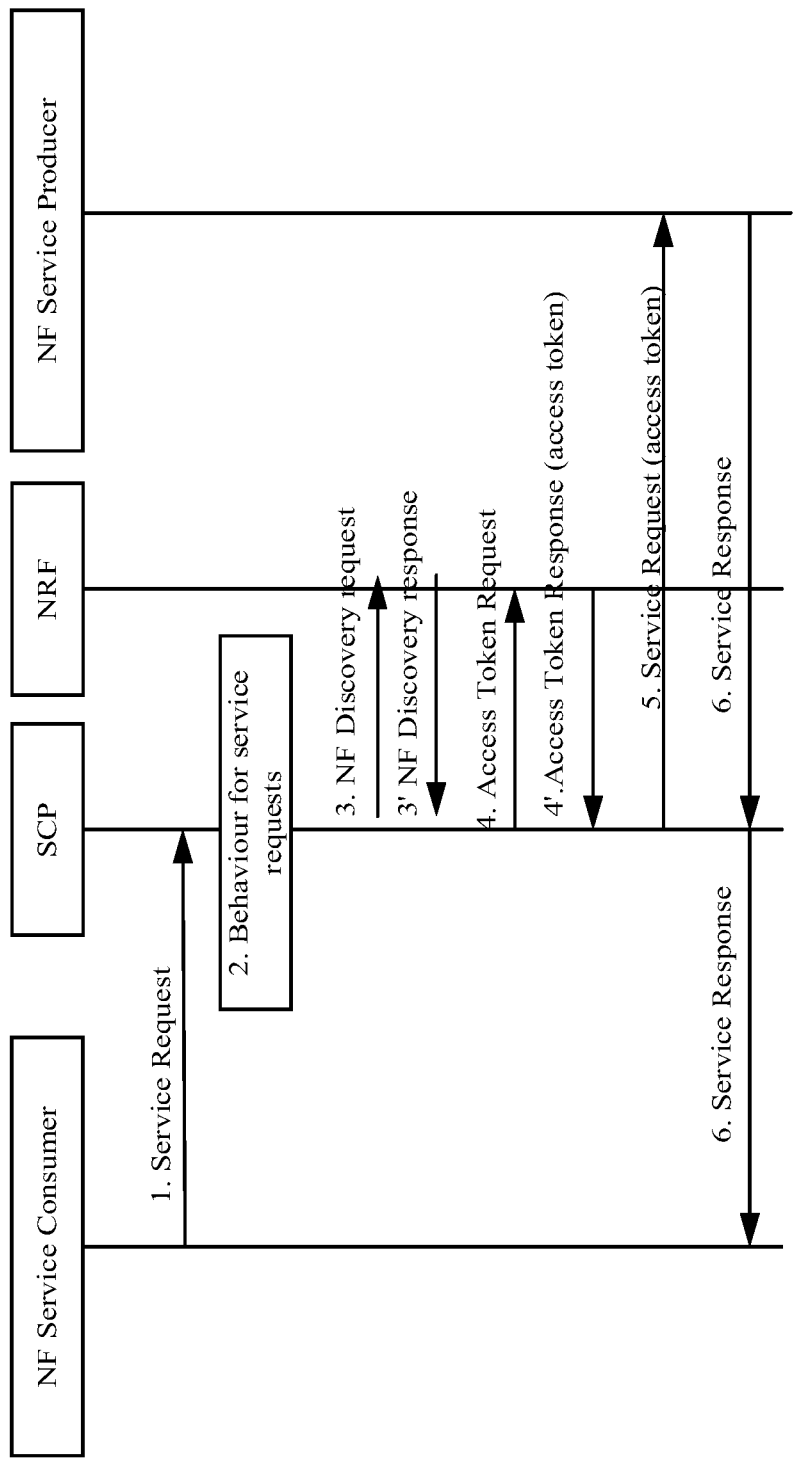
FIG. 1 shows an example of a message flow with indirect communication and delegated discovery, for a service request other than a notification or callback request according to some example embodiments of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Stage 2 work for eSBA is contained in 3GPP TS 23.501 and 3GPP TS 23.502. Currently proposals to register special destination addresses for notification messages within the NF and/or NF service profiles within the NRF are being discussed (see document S2-2001313 that will be taken as basis for contributions at the next SA2 meeting in February 2020).

A callback request is an asynchronous request that a service sends to some other service in response to certain events. A typical example of a callback is a notification, wherein, for subscription functionality, users subscribe to certain events of a service and receive a notification when this or that event occurs.

In SBA, a consumer may subscribe to a NF service producer to receive notifications from a producer when certain events occur. The NF service producer sends the notifications (e.g. status information) regularly and/or when a particular event happens, by sending a notification request message. The receiver of the notification requests acknowledges the receipt of the request by sending back a notification response. In the context of the present application, the terms "notification", "notification request", and "notification request message" are to be considered synonymous unless otherwise stated or made clear from the context. According to 3GPP TS 29.500, clause 6.10.3.3, a default notification subscription is a subscription registered in the NF profile in the NRF corresponding to notifications the NF is prepared to consume, as opposed to a notification subscription created by an explicit subscription request sent to the NF Service Producer.

A 3gpp-Sbi-Callback header has been defined by 3GPP in TS 29.500 (Rel-15) to indicate that a request is a notification or callback request that is sent across PLMNs. This header may be used between SEPPs (Security Edge Protection Proxy) to identify the security policies that may apply to a notification or a callback request (see 3GPP TS 29.573). This is limited to the few APIs that are used over inter-PLMN interfaces, and this only applies to the N32 interface (inter-PLMN roaming interface) and is used only by the SEPP. This is not used nor visible to SCP and not used for intra-PLMN communications.

The introduction of indirect communication results in some technical problems:

1) ensuring a match of the API versions of producer and consumer, in particular for notifications issued for default notification subscriptions (see clause 6.10.3.3 of 3GPP TS 29.500); and
2) distinct handling of callback requests (such as notification requests) from other service requests by the SCP.

Some example embodiments of the invention provide solutions to these technical problems.

ad 1) An NF may register default notification subscriptions in its NF profile or NF services in the NRF for notifications the NF is prepared to consume, including for each type of notification the corresponding notification endpoint (i.e. callback URI).

A NF producer may be configured with the types of notifications corresponding to default notification subscriptions) it needs to generate, and send such notifications using indirect communication with delegated discovery. In delegated discovery, an SCP discovers and selects an NF service consumer with a corresponding default notification subscription. See clause 6.10.3.3 of 3GPP TS 29.500.

There is no mechanism though to signal to the SCP the API version used by the NF Service Producer to generate the notification request. This prevents the SCP from being able to select an NF Service Consumer supporting the corresponding API version, i.e. to select a NF Service Consumer capable to handle the notification.

According to some example embodiments of the invention, the sender of a notification request includes an indication about the API version it used to generate the notification in addition to an existing indication about the notification type in the request. The SCP uses that API version to select an NF service consumer that supports receiving notifications corresponding to the notification type and complying with this API version. For this selection, SCP may retrieve NF profiles of candidate destination NF in the NRF and compare that API version with a version (new parameter) stored for that notification type in the profiles of that NF, or it may query the NRF for NFs that support that version. The SCP may then forward the notification request to the selected NF. For that purpose, a new apiversion parameter will be defined in the header of the request. In some example embodiments, the header may comprise the 3gpp-Sbi-Callback header to carry the API version in notification requests. In addition, the NF profile registered in the NRF may be extended with entrie(s) indicating the supported API versions(s) for each notification type in default notification subscriptions in the profile. In some example embodiments, only the major API version is indicated in the header and/or the NF profile.

ad 2) The SCP should differentiate notification requests from other service requests, as both types of requests require different treatments e.g. for authorization (OAuth2 is not used for notifications while it can be used in other service requests). For instance, for indirect communication with delegated discovery, it is anticipated that SA3 specifies that the SCP may be responsible for requesting/providing an access token (i.e. an example of an authorization) on behalf of the NF service consumer. In this case the SCP needs to request an access token for service requests. However, the SCP must not request an access token for notification requests. In addition, if destination addresses for notification requests are registered in addition to normal addresses applicable for other service requests in the NF profile and/or NF service profiles within the NRF, the SCP should use the destination addresses for notification messages, if any, to determine where to send notifications, or otherwise use the normal addresses.

There is no mechanism defined though to enable an SCP to distinguish notification requests from other service requests.

According to some example embodiments of the invention, the sender of an HTTP request includes an indication in the HTTP request whether the request is a callback request (such as a notification request) or a request relating to other services, when using indirect communication. The SCP receiving that request uses that indication to select the appropriate security handling for that request (e.g. by applying OAuth2 authorization for other service requests but not for notifications). In addition or alternatively, the SCP may use the indication to select the appropriate destination address in the NF profile or NF service profile that the SCP retrieves from the NRF and to send the request to that address.

For that purpose, according to some example embodiments of the invention, the use of the 3gpp-Sbi-Callback header is extended to all notification and callback requests sent with indirect communication, for all intra-PLMN and inter-PLMNs exchanges. Thus, SCP is enabled to distinguish notification/callback requests from other service requests.

In some example embodiments, a NF Service Producer sending a notification or a callback request, using indirect communication, includes in the request a 3gpp-Sbi-Callback header including the name of the notification or callback request and the API version for intra and inter-PLMN communications. In some example embodiments, the NF Service Producer includes the API version only if its API (major) version is higher than 1 (i.e., if the API (major) version is not the first version of the API).

The SCP may derive from the presence of this header that a service request is a notification or callback request and apply treatments for notification and callback requests which is different from treatment for other service requests. E.g., with respect to authorization, access token is not used in notification/callback, (see clause 6.7.3 of TS 29.500). As another example, if a notification destination is included in the corresponding NF profile or NF service profile, this address is used instead of a normal destination address for that service if the request is a notification request of callback request.

FIG. 1 shows an example of a message flow with indirect communication and delegated discovery, for a service request other than a notification or callback request, i.e. for a request that does not correspond to a "Notify" request as explained hereinabove and specified at greater detail in clause 7.1.2 of 3GPP TS 23.501. The messages shown in FIG. 1 are as follows:

1. NF Service Consumer sends a service request, using indirect communication with delegated discovery. The service request does not contain a header indicating that the request is a notification or callback request, such as 3gpp-Sbi-Callback header.

2. The SCP determines that this is a service request and not a callback or notification request, based on the absence of the header indicating that the request is a notification or callback request, such as the 3gpp-Sbi-Callback header.

3. The SCP sends a NF Discovery request to the NRF to retrieve candidate NF service producers that can serve the request.

If the request contains a Routing Binding indication, the SCP sends a NF Discovery request to the NRF to retrieve candidate NF service producer with the NF service type as indicated in the request URI. The NRF returns corresponding NF profiles and/or NF service profiles that will contain a normal destination address and may contain a notification destination address in addition. The SCP uses the normal destination address.

In message 5, the SCP sends the request to the destination address determined in that manner and exchanges the host portion of the request URI with that destination address.

4. The SCP requests the OAuth2 authorization server (NRF) to generate an access token to get authorization to access the requested service at the selected NF Service Producer.

5. The SCP sends the service request to the selected NF Service Producer, with the access token granted by the OAuth2 authorization server.

6. The NF Service Producer serves the request and returns a response.

Figure 2:
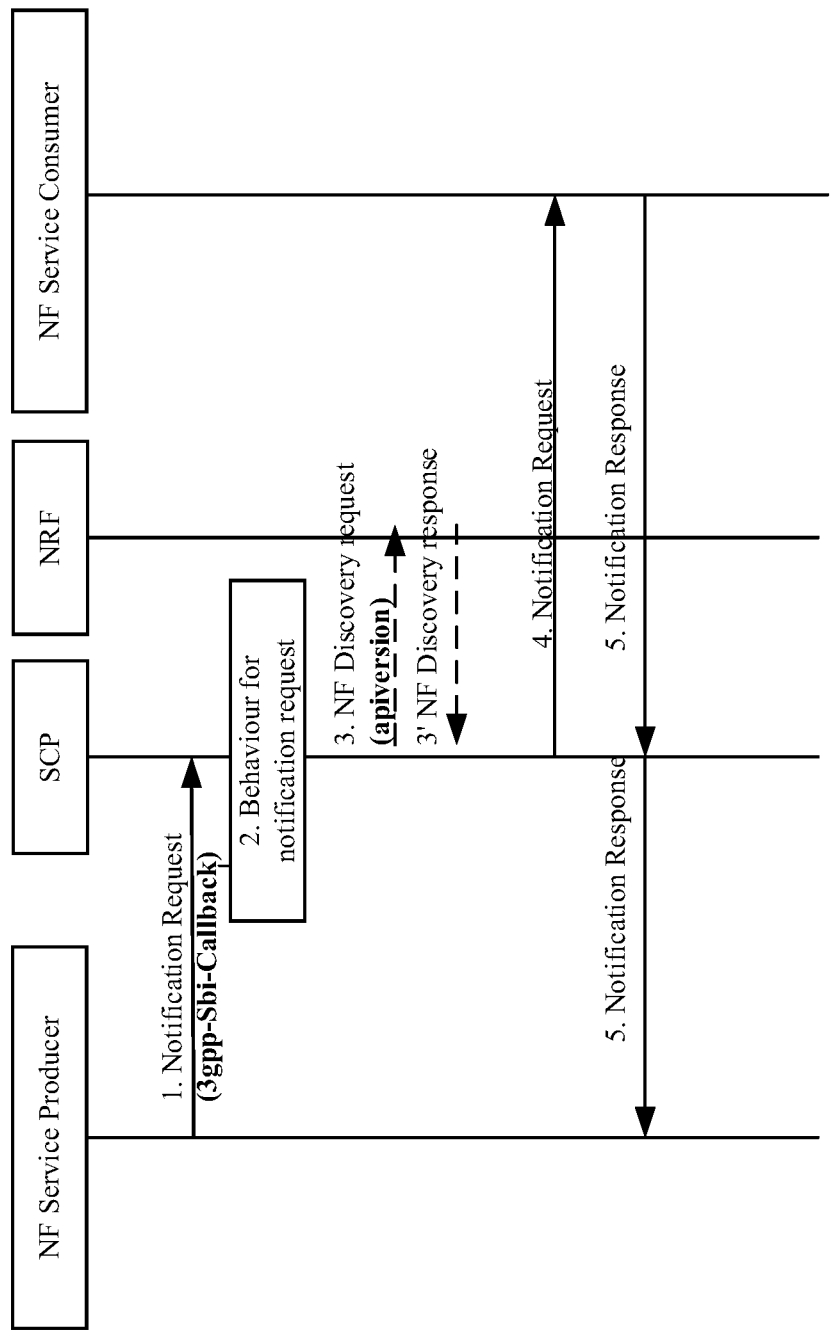
FIG. 2 shows an example of a message flow with indirect communication, for a notification or a callback request according to some example embodiments of the invention.

FIG. 2 shows an example of a message flow with indirect communication, for a notification or a callback request. The messages are as follows:

1. NF Service Producer sends a notification or callback request, using indirect communication (intra-PLMN or inter-PLMN communication). The notification or callback request contains a header indicating that the request is a notification or callback request, such as 3gpp-Sbi-Callback header. The header indicating that the request is a notification or callback request, such as 3gpp-Sbi-Callback header, contains the name of the notification or callback and (at least if this is a notification issued for a default notification subscription) the api version (for example, if the API major version is higher than 1). Otherwise, a Routing Binding Indication is included in the notification request. The routing binding indication contains a NF type and a service that the NF service consumer uses to handle the notification or an indication that addresses at NF level are used.

Examples of the 3gpp-Sbi-Callback header are as follows:

3gpp-Sbi-Callback: Nnrf_NFManagement_NFStatusNotify

3gpp-Sbi-Callback: Nudm_SDM_Notification; apiversion=2

In the first example, the header informs that the request is a notification request, sent by the NRF to notify a NF status change. The API (major) version is 1 (first version). Therefore, in this example, the header does not comprise an explicit indication of the API version. In the second example, the header informs that the request is a notification request, sent by the UDM to notify subscription data changes. In addition, it informs that the API (major) version is 2.

2. The SCP determines that this is a notification or a callback request, based on the receipt of this header.

3. If the request contains neither a Routing Binding indication nor a notification address (i.e. URI) (or a URI that is known to be not reachable) (note: a notification sent for a default notification subscription will never contain a Routing Binding indication nor a notification address of the target NF, when using indirect communication), the SCP sends a NF Discovery request to the NRF to retrieve candidate NF service consumers that support the corresponding default notification type and that support the API version used by the NF Service Producer to generate the notification. The NRF selects NF service consumers where that API version is among the API versions registered for that default notification type (in default notification subscriptions). The NF service consumer has previously registered its NF profile in the NRF and has included entries indicating the supported version(s) for each default notification type it supports.

If the request contains a Routing Binding indication (e.g. notifications issued for an explicit event subscription) and the notification address (URI) is not reachable, the SCP sends a NF Discovery request to the NRF to retrieve candidate NF service consumers with the NF service type in the Routing Binding Indication and that support the service within the Routing Binding Indication (if any is included). The NRF returns corresponding NF profiles and/or NF service profiles that will contain a normal destination address and may contain a notification destination address in addition. If the Routing Binding indication contains a service name, the SCP uses the corresponding NF service profile. If a notification destination address is contained in that service profile, the SCP uses that address and otherwise the normal destination address. If the Routing Binding indication contains an Indication to use NF profile address (for instance "NF" as service name), the SCP uses the corresponding NF profile. If a notification destination address is contained in that profile, the SCP uses that address and otherwise the normal destination address.

The SCP sends the request to the destination address determined in that manner and exchanges the host portion of the request URI with that destination address.

4. The SCP sends the notification request to the NF Service Consumer, without any access token (i.e., without being authorized).

5. The NF Service Consumer acknowledges the receipt of the notification request.

According to some example embodiments of the invention, the apparatuses (such as NF, NRF, or SCP or a component thereof) and methods are defined by 3GPP specifications. Hence, it is suggested to update these specifications. A motivation for an update is as follows:

1) Clause 6.10.3.3 of 3GPP TS 29.500 does not specify how to ensure that the notification is sent to an NF service consumer that supports the same API version as used by the NF service producer to generate the notification.

2) The SCP may need to differentiate notification requests from other service requests, e.g. because both types of requests require different treatments for authorization (OAuth2 is not used for notifications while it can be used in other service requests). For instance, for indirect communication with delegated discovery, if the SCP is responsible for requesting/providing an access token on behalf of the NF service consumer, the SCP needs to request an access token for service requests other than notification requests.

A 3gpp-Sbi-Callback header has been defined in Rel-15 for notifications and callbacks sent across PLMNs. It is proposed to extend the use of this header to all notification and callback requests sent with indirect communication, to enable the SCP to distinguish notification/callback requests from other service requests.

3) The SCP routes notifications issued for default notification subscriptions by discovering and selecting a NF service consumer instance supporting the default notification subscription. The notification needs to carry the major version of the API to enable the SCP to select a NF Service Producer supporting that version. It is proposed to extend 3gpp-Sbi-Callback header with a new "apiversion" parameter carrying the API major version.

This can also be useful information for a SEPP to apply data encryption and modification policies applicable to the API version.

Thus, according to some example embodiments of the invention, apparatuses (such as NF, NRF, or SCP or a component thereof) and methods will be defined at least partly by 3GPP TS 29.500, updated as follows:

new procedural requirements in clause 6.10.x (Notification and callback request sent with Indirect Communication)

3gpp-Sbi-Callback header extensions to enable the encoding of any notification or callback requests defined in the 5GC SBA, and the encoding of the API version: clause 5.2.3.2.3 and Annex B For the details, see FIGS. 3 to 7.

Furthermore, according to some example embodiments of the invention, apparatuses (such as NF, NRF, or SCP or a component thereof) and methods will be defined at least partly by 3GPP TS 29.510, updated as shown in FIG. 8.

The proposed changes may be summarized as follows:

1) Notification and callback requests sent with indirect communication shall include the 3gpp-Sbi-Callback header to enable the SCP to differentiate these requests from other service requests.

2) A new apiversion parameter is defined in the 3gpp-Sbi-Callback header to carry the API major version in notification requests.

Figure 10:
FIG. 10 shows a method according to an example embodiment of the invention.
Figure 9:
FIG. 9 shows an apparatus according to an example embodiment of the invention.

FIG. 9 shows an apparatus according to an embodiment of the invention. The apparatus may be a NF such as a producer or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for sending 10. The means for sending 10 may be an sending means. The means for sending 10 may be a sender configured to perform said sending. The means for sending 10 may be an sending processor configured to cause said sending to be performed.

The means for sending 10 sends a notification or callback request and indicates in said request a version of a programming interface configured to provide said request. (S10). An API is an example of a programming interface.

Figure 12:
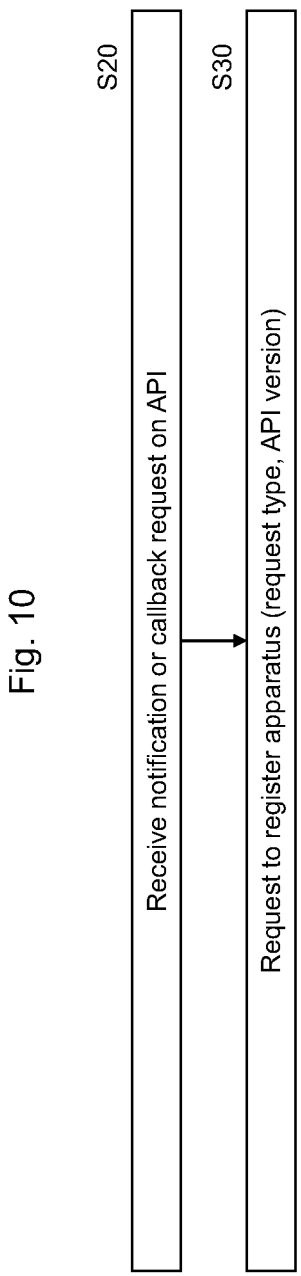
FIG. 12 shows a method according to an example embodiment of the invention.
Figure 11:
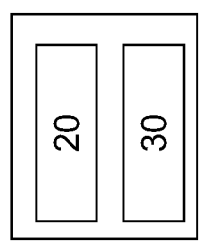
FIG. 11 shows an apparatus according to an example embodiment of the invention.

FIG. 11 shows an apparatus according to an embodiment of the invention. The apparatus may be a NF such as a consumer or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for receiving 20 and a means for requesting 30. The means for receiving 20 and means for requesting 30 may be a receiving means and requesting means, respectively. The means for receiving 20 and means for requesting 30 may be a receiver configured to perform said receiving and requestor configured to perform said requesting, respectively. The means for receiving 20 and means for requesting 30 may be a receiving processor configured to cause said receiving to be performed and requesting processor configured to cause said requesting to be performed, respectively.

The means for receiving 20 receives, on a programming interface of an interface version, a notification or callback request of a type (S20). An API is an example of a programming interface.

The means for requesting 30 requests, at a database (such as a NRF), a registration of the apparatus, the type, and one or more interface versions that the programming interface supports for the notification or callback (S30). The registration of the apparatus may be a subscription to a notification (notification subscription). The notification subscription may be a default notification subscription.

S20 and S30 may be performed in an arbitrary sequence. S20 and S30 may be performed fully or partly in parallel.

Figure 14:
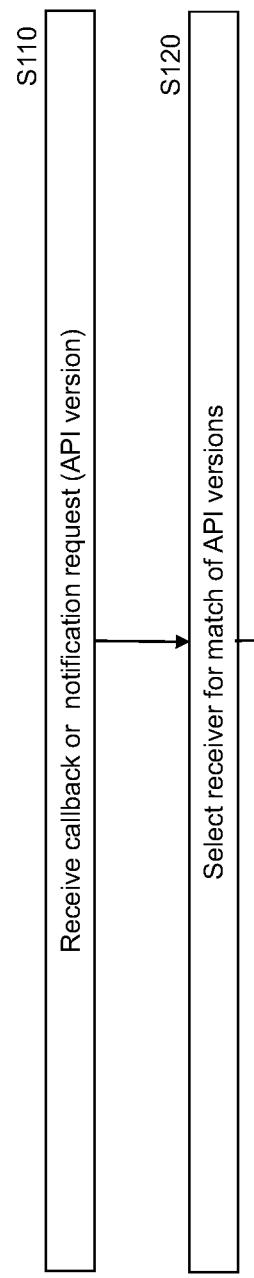
FIG. 14 shows a method according to an example embodiment of the invention.
Figure 13:
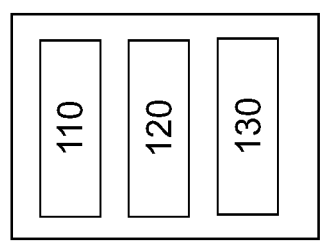
FIG. 13 shows an apparatus according to an example embodiment of the invention.

FIG. 13 shows an apparatus according to an embodiment of the invention. The apparatus may be a SCP or an NRF or an element thereof. FIG. 14 shows a method according to an embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises means for receiving 110, means for selecting 120, and means for sending 130. The means for receiving 110, means for selecting 120, and means for sending 130 may be a receiving means, selecting means, and sending means, respectively. The means for receiving 110, means for selecting 120, and means for sending 130 may be a receiver configured to perform said receiving, selector configured to perform said selecting, and a sender configured to perform said sending, respectively. The means for receiving 110, means for selecting 120, and means for sending 130 may be a receiving processor configured to cause said receiving to be performed, selecting processor configured to cause said selecting to be performed, and sending processor configured to cause said sending to be performed, respectively.

The means for receiving 110 receives a first indication of a version of a producer programming interface and a second indication of a version of a programming interface (of a same type) that a consumer can support (S110). The producer programming interface is configured to produce a notification request or a callback request. The consumer is configured to consume the notification request or the callback request, respectively. The means for receiving may receive the indications of the versions directly from the respective programming interfaces, or jointly, e.g. in a profile (such as a NF Profile stored in NRF). Each of the programming interfaces may be an API.

The means for checking 120 checks if the version of the producer programming interface generating the notification is compatible with the version of the programming interface (of the same type) the consumer can support (S120). For example, it may compare the version numbers received in the notification request from the NF Service Producer and registered in the NF Profile of the NF Service Consumer.

If the version of the version of the producer programming interface is not compatible with the version of the programming interface (of the same type) the consumer supports (S120="no"), the means for inhibiting 130 inhibits selecting the consumer as a target for forwarding the notification request (S130).

FIG. 15 shows an apparatus according to an embodiment of the invention. The apparatus may be a data repository (database) such as a NRF or an element thereof. FIG. 16 shows a method according to an embodiment of the invention. The apparatus according to FIG. 15 may perform the method of FIG. 16 but is not limited to this method. The method of FIG. 16 may be performed by the apparatus of FIG. 15 but is not limited to being performed by this apparatus.

The apparatus comprises first means for receiving 150, means for storing 160, second means for receiving 170, means for selecting 180, and means for responding 190. The first means for receiving 150, means for storing 160, second means for receiving 170, means for selecting 180, and means for responding 190 may be a first receiving means, storing means, second receiving means, selecting means, and responding means, respectively. The first means for receiving 150, means for storing 160, second means for receiving 170, means for selecting 180, and means for responding 190 may be a first receiver configured to perform said receiving, storage configured to perform said storing, second receiver configured to perform said receiving, selector configured to perform said selecting, and responder configured to perform said responding, respectively. The first means for receiving 150, means for storing 160, second means for receiving 170, means for selecting 180, and means for responding 190 may be a first receiving processor configured to cause said receiving to be performed, storing processor configured to cause said storing to be performed, second receiving processor configured to cause said receiving to be performed, selecting processor configured to cause said selecting to be performed, and responding processor configured to cause said responding to be performed, respectively.

The first means for receiving 150 receives a registration request of a candidate receiver (S150). The registration request indicates that the candidate receiver is suitable for receiving, by a programming interface, a notification or callback request of a candidate type. The registration request contains an identification of said candidate receiver, an indication of the candidate type of said request, and an indication of one or multiple candidate versions the programming interface is compatible with. A candidate receiver may register itself several times.

The means for storing 160 stores the identification of said candidate receiver along with said candidate type and said one or multiple candidate versions (S160).

The second means for receiving 170 receives a query for an identification of a receiver (S170), The query comprises an indication of a requested type of notification or callback request and an indication of a requested version of a programming interface.

The means for selecting 180 selects an identification among the stored identifications of the candidate receivers (S180). For the selected identification, the stored candidate type matches the requested type and one of the stored candidate versions matches the requested version.

The means for responding 190 responds to the query indicating the selected identification (S190) including the supported versions of the programming interface generating the notification or callback requests.

FIG. 17 shows an apparatus according to an embodiment of the invention. The apparatus may be a data repository (database) such as a NRF or an element thereof. FIG. 18 shows a method according to an embodiment of the invention. The apparatus according to FIG. 17 may perform the method of FIG. 18 but is not limited to this method. The method of FIG. 18 may be performed by the apparatus of FIG. 17 but is not limited to being performed by this apparatus.

The apparatus comprises first means for receiving 250, means for storing 260, second means for receiving 270, means for selecting 280, and means for responding 290. The first means for receiving 250, means for storing 260, second means for receiving 270, means for selecting 280, and means for responding 290 may be a first receiving means, storing means, second receiving means, selecting means, and responding means, respectively. The first means for receiving 250, means for storing 260, second means for receiving 270, means for selecting 280, and means for responding 290 may be a first receiver configured to perform said receiving, storage configured to perform said storing, second receiver configured to perform said receiving, selector configured to perform said selecting, and responder configured to perform said responding, respectively. The first means for receiving 250, means for storing 260, second means for receiving 270, means for selecting 280, and means for responding 290 may be a first receiving processor configured to cause said receiving to be performed, storing processor configured to cause said storing to be performed, second receiving processor configured to cause said receiving to be performed, selecting processor configured to cause said selecting to be performed, and responding processor configured to cause said responding to be performed, respectively.

The first means for receiving 250 receives a registration request of a candidate receiver (S250). The registration request indicates that the candidate receiver is suitable for receiving, by a programming interface, a notification or callback request of a candidate type. The registration request contains an identification of said candidate receiver, an indication of the candidate type of said request, and an indication of one or multiple candidate versions the programming interface is compatible with.

The means for storing 260 stores the identification of said candidate receiver along with said candidate type and said one or multiple candidate versions (S160).

The second means for receiving 270 receives a query for an identification of a receiver (S270), The query comprises an indication of a requested type of notification or callback request.

The means for selecting 280 selects an identification among the stored identifications of the candidate receivers (S280). For the selected identification, the stored candidate type matches the requested type.

The means for responding 190 responds to the query indicating the selected identification and said one or more candidate versions stored along with the selected identification (S190).

As may be seen from the above example embodiments, the check if the API versions of producer and consumer match may be performed in NRF or in SCP. Accordingly, the API version must be present in the NRF or in the SCP. If NFProfiles comprising the API version(s) are stored in NRF, NRF provides the API version(s) of the selected consumer to SCP if the check is made in SCP.

Figure 20:
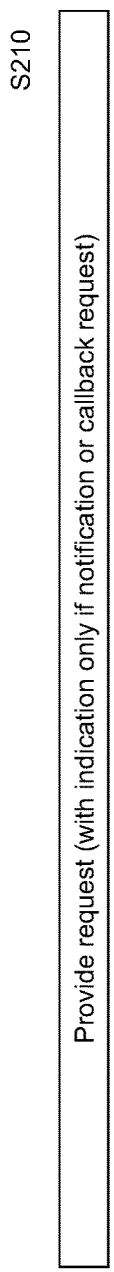
FIG. 20 shows a method according to an example embodiment of the invention.
Figure 19:
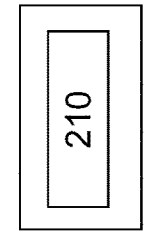
FIG. 19 shows an apparatus according to an example embodiment of the invention.

FIG. 19 shows an apparatus according to an embodiment of the invention. The apparatus may be a network function or an element thereof. FIG. 20 shows a method according to an embodiment of the invention. The apparatus according to FIG. 19 may perform the method of FIG. 20 but is not limited to this method. The method of FIG. 20 may be performed by the apparatus of FIG. 19 but is not limited to being performed by this apparatus.

The apparatus comprises means for providing 210. The means for providing 210 may be a providing means. The means for providing 210 may be a provider configured to perform said providing. The means for providing 210 may be a providing processor configured to cause said providing to be performed.

The means for providing 210 provide, via a communication proxy, a (S210). The request comprises an indication of the request being one of a callback request and a notification request if, and only if, the request is the callback request and the notification request, respectively. The communication proxy may be a SCP.

Figure 22:
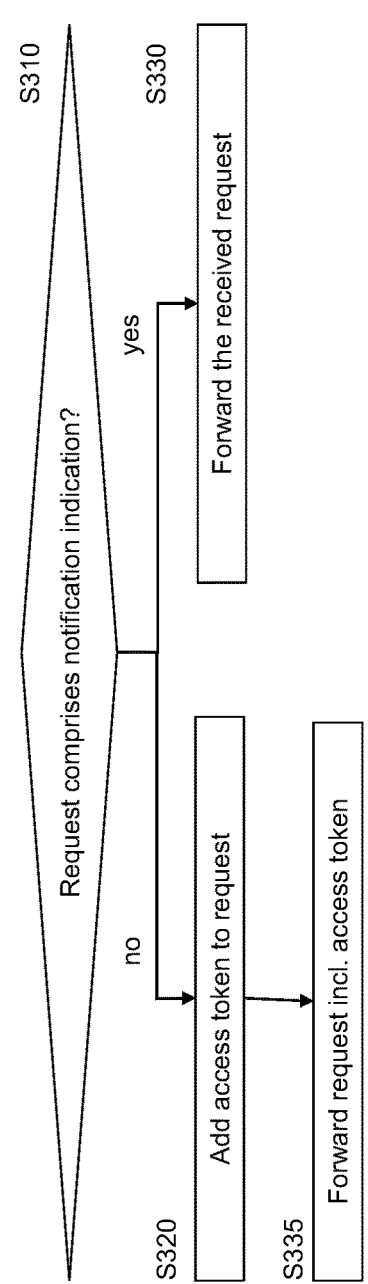
FIG. 22 shows a method according to an example embodiment of the invention.
Figure 21:
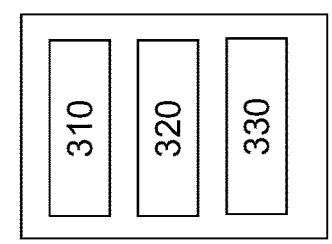
FIG. 21 shows an apparatus according to an example embodiment of the invention.

FIG. 21 shows an apparatus according to an embodiment of the invention. The apparatus may be a communication proxy such as a SCP or an element thereof. FIG. 22 shows a method according to an embodiment of the invention. The apparatus according to FIG. 21 may perform the method of FIG. 22 but is not limited to this method. The method of FIG. 22 may be performed by the apparatus of FIG. 21 but is not limited to being performed by this apparatus.

The apparatus comprises means for monitoring 310, means for adding 320, and means for forwarding 330. The means for monitoring 310, means for adding 320, and means for forwarding 330 may be a monitoring means, adding means, and forwarding means, respectively. The means for monitoring 310, means for adding 320, and means for forwarding 330 may be a monitor configured to perform said monitoring, adder configured to perform said adding, and a forwarder configured to perform said forwarding, respectively. The means for monitoring 310, means for adding 320, and means for forwarding 330 may be a monitoring processor configured to cause said monitoring to be performed, adding processor configured to cause said adding to be performed, and forwarding processor configured to cause said forwarding to be performed, respectively.

The means for monitoring 310 monitors if a received request comprises a notification indication (S310). The notification indication indicates that the request is one of a callback request and a notification request.

If, and only if, said request does not contain said notification indication (S310="no"), the means for adding 320 adds an access token to said request (S320).

If said request contains said notification indication (S310="yes"), the means for forwarding 330 forwards the received request (S330). If said request does not contain said notification indication (S310="no"), the means for forwarding 330 forwards the request including the access token (S335).

Figure 24:
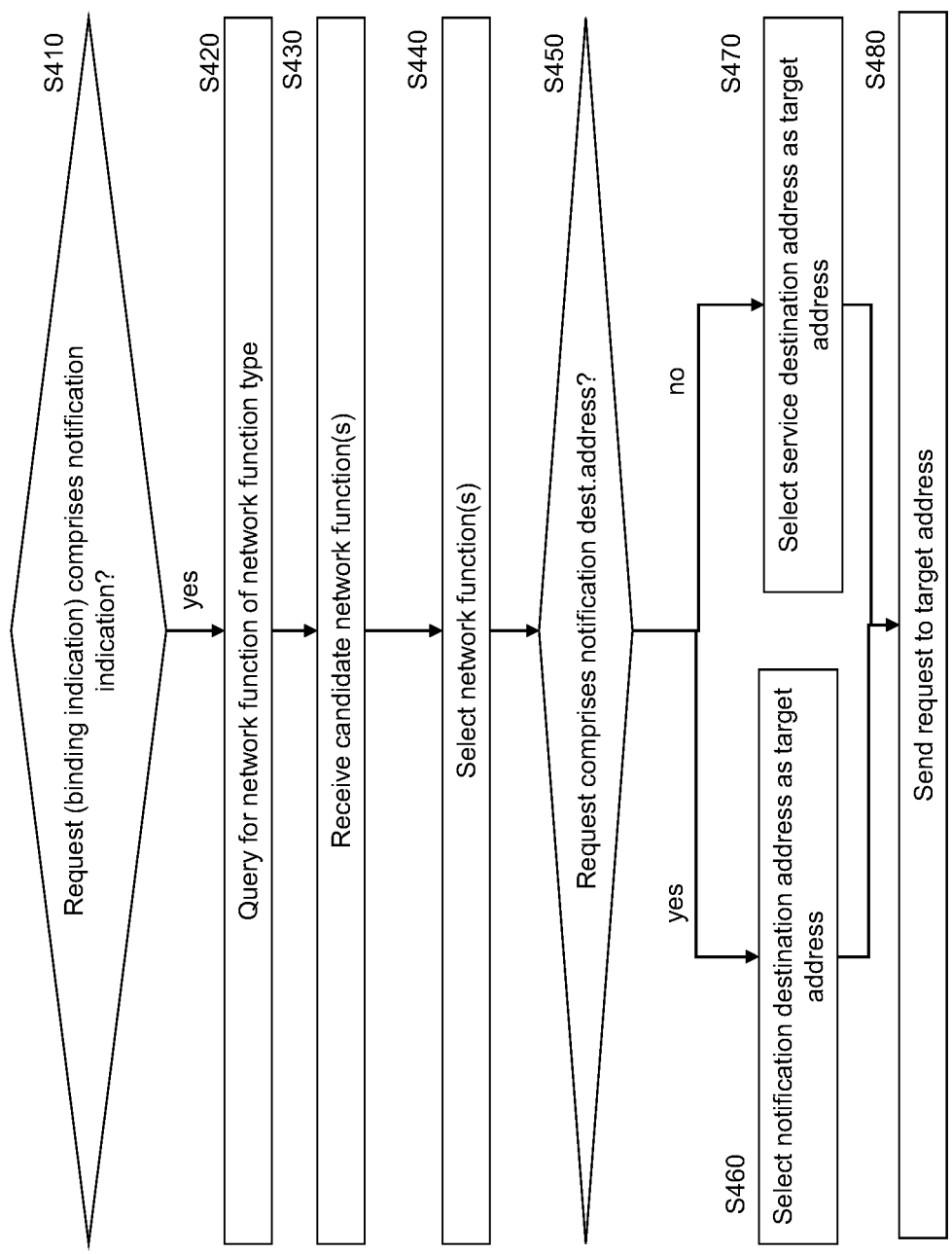
FIG. 24 shows a method according to an example embodiment of the invention.
Figure 23:
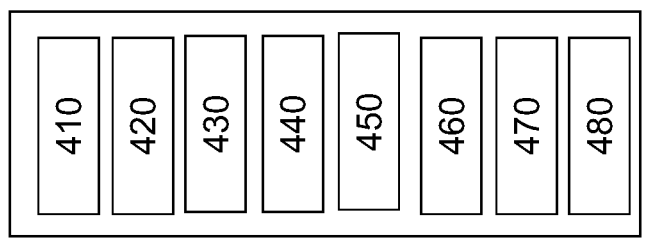
FIG. 23 shows an apparatus according to an example embodiment of the invention.
Figure 25:
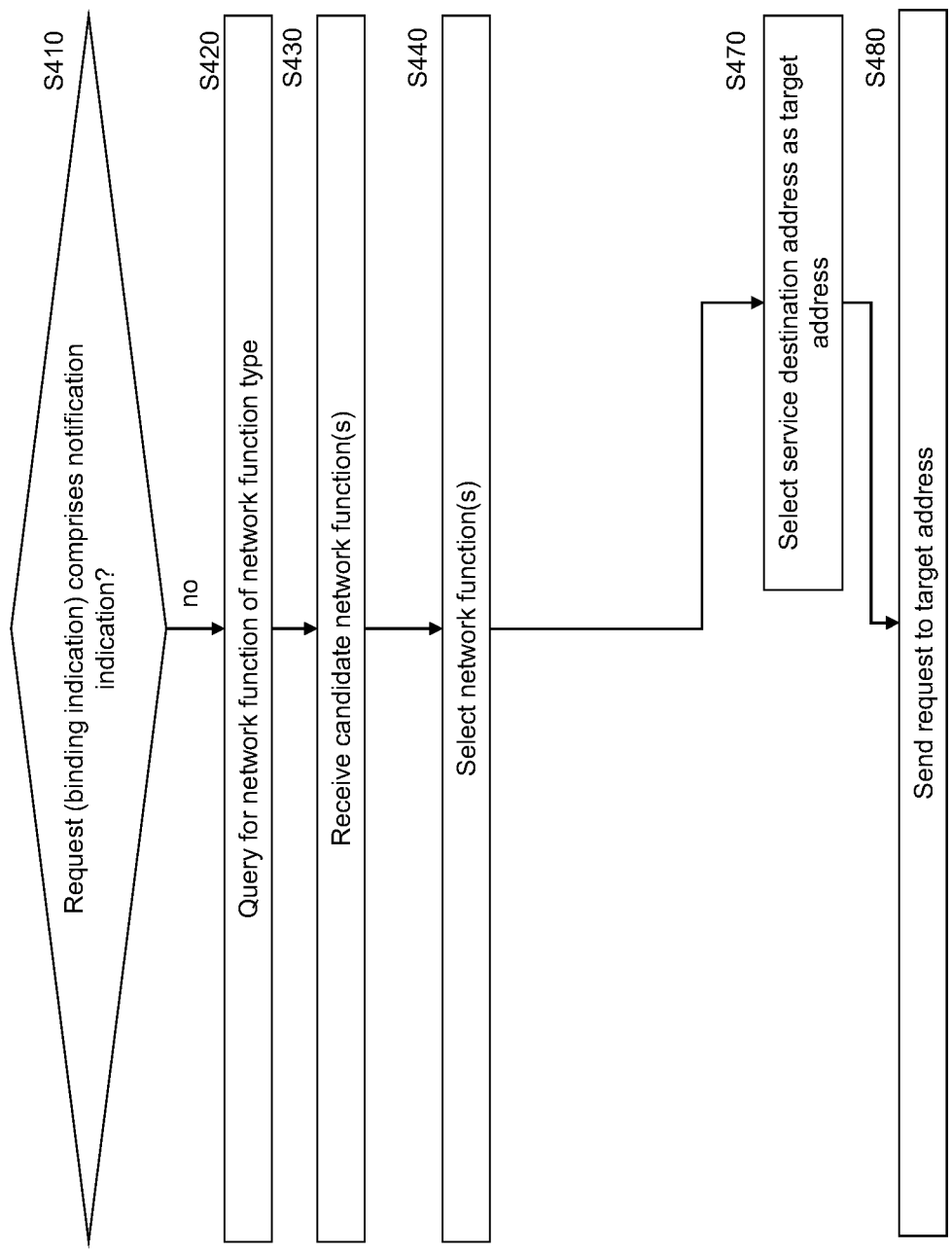
FIG. 25 shows another path of the method according to FIG. 24.

FIG. 23 shows an apparatus according to an embodiment of the invention. The apparatus may be a communication proxy such as a SCP or an element thereof. FIGS. 24 and 25 show a method according to an embodiment of the invention. The apparatus according to FIG. 23 may perform the method of FIGS. 24 and 25 but is not limited to this method. The method of FIGS. 24 and 25 may be performed by the apparatus of FIG. 23 but is not limited to being performed by this apparatus.

The apparatus comprises means for monitoring 410, means for querying 420, means for receiving 430, first means for selecting 440, means for checking 450, second means for selecting 460, third means for selecting 470, and means for sending 480. The means for monitoring 410, means for querying 420, means for receiving 430, first means for selecting 440, means for checking 450, second means for selecting 460, third means for selecting 470, and means for sending 480 may be a monitoring means, querying means, receiving means, first selecting means, checking means, second selecting means, third selecting means, and sending means, respectively. The means for monitoring 410, means for querying 420, means for receiving 430, first means for selecting 440, means for checking 450, second means for selecting 460, third means for selecting 470, and means for sending 480 may be a monitor configured to perform said monitoring, questioner configured to perform said querying, receiver configured to perform said receiving, first selector configured to perform said selecting, checker configured to perform said checking, second selector configured to perform said selecting, third selector configured to perform said selecting, and sender configured to perform said sending, respectively. The means for monitoring 410, means for querying 420, means for receiving 430, first means for selecting 440, means for checking 450, second means for selecting 460, third means for selecting 470, and means for sending 480 may be a monitoring processor configured to cause said monitoring to be performed, querying processor configured to cause said querying to be performed, receiving processor configured to cause said receiving to be performed, first selecting processor configured to cause said selecting to be performed, checking processor configured to cause said checking to be performed, second selecting processor configured to cause said selecting to be performed, third selecting processor configured to cause said selecting to be performed, and sending processor configured to cause said sending to be performed, respectively.

The means for monitoring 410 monitors if a received request comprises a notification indication (S410). The request comprises a binding indication. The binding indication includes a network function type. The notification indication indicates that the request is one of a callback request and a notification request. FIG. 24 shows the method for a case that the request comprises the notification indication (S410="yes"). FIG. 25 shows the method for a case that the request does not comprise the notification indication (S410="no").

The means for querying 420 queries a database (e.g. NRF) for a network function of said network function type (S420). The means for receiving 430 receives a response for said query from the database (S430). The response indicates one or several candidate network functions. In addition, the response indicates, for each of the candidate network functions, respective one or several candidate service destination addresses. Optionally, the response may comprise one or several candidate notification destination addresses in addition to the one or several candidate service destination addresses.

The first means for selecting 440 selects a selected network function among the candidate network functions indicated in the response (S440).

The means for checking 450 checks if the response comprises one or several respective candidate notification destination addresses for the selected network function (S450).

If the received request comprises the notification indication (S410="yes") and the response comprises the one or several respective candidate notification destination addresses for the selected network function (S450="yes"), the second means for selecting 460 selects a notification destination address among the candidate notification destination addresses of the selected network function as a target address (S460).

If the received request does not comprises the notification indication (S410="no") or the response does not comprise the one or several respective candidate notification destination addresses for the selected network function (S450="no"), the third means for selecting 470 selects a destination address among the candidate destination addresses of the selected network function as the target address (S470).

The means for sending 480 sends the request towards the target address (S480).

Figure 27:
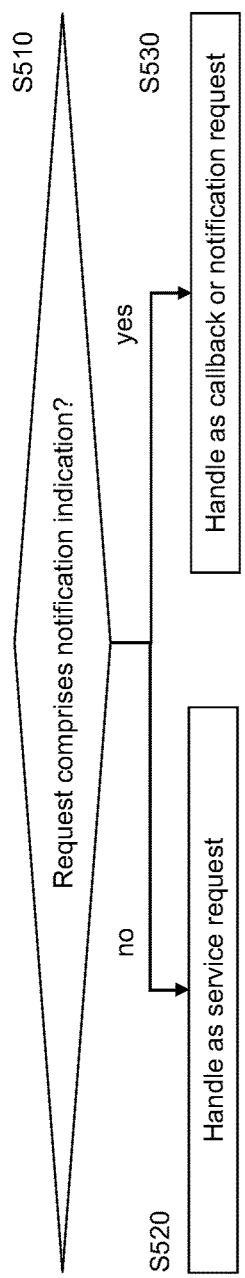
FIG. 27 shows a method according to an example embodiment of the invention.
Figure 26:
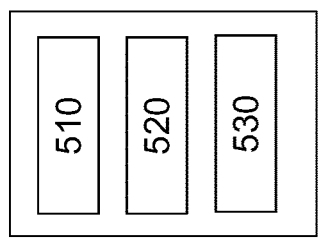
FIG. 26 shows an apparatus according to an example embodiment of the invention.

FIG. 26 shows an apparatus according to an embodiment of the invention. The apparatus may be a communication proxy such as a SCP or an element thereof. FIG. 27 shows a method according to an embodiment of the invention. The apparatus according to FIG. 27 may perform the method of FIG. 26 but is not limited to this method. The method of FIG. 26 may be performed by the apparatus of FIG. 27 but is not limited to being performed by this apparatus.

The apparatus comprises means for monitoring 510, means for service request handling 520, and means for notification request handling 530. The means for monitoring 510, means for service request handling 520, and means for notification request handling 530 may be a monitoring means, service request handling means, and notification request handling means, respectively. The means for monitoring 510, means for service request handling 520, and means for notification request handling 530 may be a monitor configured to perform said monitoring, service request handler configured to perform said service request handling, and a notification request handler configured to perform said notification request handling, respectively. The means for monitoring 510, means for service request handling 520, and means for notification request handling 530 may be a monitoring processor configured to cause said monitoring to be performed, service request handling processor configured to cause said service request handling to be performed, and notification request handling processor configured to cause said notification request handling to be performed, respectively.

The means for monitoring 510 monitors if a received request comprises a notification indication (S510). The notification indication indicates that the request is one of a callback request and a notification request.

If, and only if, said request does not contain said notification indication (S310="no"), the means for service request handling 520 handles the request as a service request (S520).

If said request contains said notification indication (S510="yes"), the means for notification request handling 530 handles the request as a callback or notification request (S530). The handling of a callback or notification request is different from the handling of a service request. Examples are given above in FIGS. 21 to 25 and related description.

Figure 28:
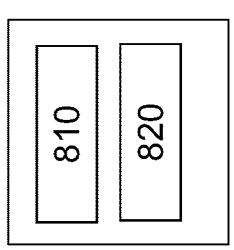
FIG. 28 shows an apparatus according to an example embodiment of the invention.

FIG. 28 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 10, 12, 14, 16, 18, 20, 22, 24, 25, and 27 and related description.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example, a network function such as a service producer or a service consumer, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a communication proxy such as a SCP, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a data repository such as a NRF, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising
at least one processor; and
at least one memory including computer program code;
the at least one memory and the computer program code configured to, with the at least one processor, cause the apparatus at least to:
 send, using indirect communication via a proxy, a service request for selection of a service consumer, said service request being one of a notification request or a callback request; and
 indicate, in a 3gpp-Sbi_callback header of said service request, a version of an application programming interface configured to support said service request, based on said version of the application programming interface being greater than a defined value,
wherein a presence of said 3gpp-Sbi_callback header of said service request permits derivation by said proxy that said service request is one of said notification request or said callback request and differentiated treatment by said proxy_of said service request.

2. The apparatus according to claim 1, wherein the at least one memory and the computer program code are further configured to, with the at least one processor, cause the apparatus at least to:
indicate, in said 3gpp-Sbi_callback header of said service request, said service request is one of said notification request or said callback request.

3. The apparatus according to claim 1, wherein the at least one memory and the computer program code are further configured to, with the at least one processor, cause the apparatus at least to:
indicate, in said 3gpp-Sbi_callback header of said service request, a name of said notification request or a name of said callback request, and
wherein the defined value is 1.

4. The apparatus according to claim 1, wherein the at least one memory and the computer program code are further configured to, with the at least one processor, cause the apparatus at least to:
refrain from including, in said 3gpp-Sbi_callback header of said service request, an indication of said version of said application programming interface in the event said version is equal to the defined value,
wherein the defined value is 1.

5. The apparatus according to claim 1,
wherein said apparatus is configured as a service producer.

6. An apparatus, comprising
at least one processor; and
at least one memory including computer program code;
the at least one memory and the computer program code configured to, with the at least one processor, cause the apparatus at least to:
receive a service request from a service producer, said service request comprising a 3gpp-Sbi_callback header,
 wherein said 3gpp-Sbi_callback header includes an indication of a version of an application programming interface configured to support said service request, based on said version of said application programming interface being greater than a defined value;

derive said service request is one of a notification request or a callback request based on a presence of said 3gpp-Sbi_callback header;
select a service consumer for said service request that is configured to support said version of said application programming interface; and
send said service request to said service consumer,
wherein said apparatus is configured as a proxy for indirect communication between said service producer and said service consumer.

7. The apparatus according to claim 6, wherein the at least one memory and the computer program code are further configured to, with the at least one processor, cause the apparatus at least to:
handle said service request as said notification request or said callback request based on deriving said service request is one of said notification request or said callback request,
wherein handling said service request as said notification request or said callback request is different from handling a service request of a type other than said notification request or said callback request.

8. The apparatus according to claim 6, wherein said apparatus is configured as the proxy with delegated discovery.

9. The apparatus according to claim 8,
wherein said proxy is a service communication proxy.

10. The apparatus according to claim 6, wherein the at least one memory and the computer program code are further configured to, with the at least one processor, cause the apparatus at least to:
handle said service request as said notification request or said callback request differently from handling a service request of a type other than said notification request or said callback request.

11. A method, comprising
sending, using indirect communication via a proxy, a service request for selection of a service consumers; and
indicating, in a 3gpp-Sbi_callback header of said service request, a version of an application programming interface configured to support said service request, based on said version of the application programming interface being greater than a defined value,
wherein a presence of said 3gpp-Sbi_callback header of said service request permits derivation by said proxy that said service request is one of said notification request or said callback request and differentiated treatment by said proxy_of said service request.

12. The method according to claim 11, further comprising indicating, in said 3gpp-Sbi_callback header of said service request, said service request is one of said notification request or said callback request.

13. The method according to claim 11, further comprising indicating, in said 3gpp-Sbi_callback header of said service request, a name of said notification request or a name of said callback request,
wherein the defined value is 1.

14. The method according to claim 11, further comprising refraining from including, in said 3gpp-Sbi_callback header of said service request, an indication of said version of said application programming interface in the event said version is equal to the defined value,
wherein the defined value is 1.

15. A method, comprising
receiving, at an apparatus, a service request from a service producer, said service request comprising a 3gpp-Sbi-_callback header,
wherein said 3gpp-Sbi_callback header includes an indication of a version of an application programming interface configured to support said service request, based on said version of said application programming interface being greater than a defined value;
deriving, by said apparatus, said service request is one of a notification request or a callback request based on a presence of the 3gpp-Sbi_callback header;
selecting, by said apparatus, a service consumer for said service request that is configured to support said version of said application programming interface; and
sending, by said apparatus, said service request to said service consumer,
wherein said apparatus serves as a proxy for indirect communication between said service producer and said service consumer.

16. The method according to claim 15, further comprising
handling, at said apparatus, said service request as said notification request or said callback request based on deriving said service request is one of said notification request or said callback request,
wherein handling said service request as said notification request or said callback request is different from handling a service request of a type other than said notification request or said callback request.

17. The method according to claim 15, wherein said apparatus is configured as the proxy with delegated discovery.

* * * * *

UNITED STATES PATENT AND TRADEMARK OFFICE
CERTIFICATE OF CORRECTION

| | | |
|---|---|---|
| PATENT NO. | : 11,650,866 B2 | |
| APPLICATION NO. | : 17/164455 | |
| DATED | : May 16, 2023 | |
| INVENTOR(S) | : Bruno Landais et al. | |

It is certified that error appears in the above-identified patent and that said Letters Patent is hereby corrected as shown below:

In the Claims

In Column 19, Line 38, Claim 11, delete "consumers;" and insert -- consumer; --, therefor.

Signed and Sealed this
Twenty-second Day of August, 2023

Katherine Kelly Vidal
*Director of the United States Patent and Trademark Office*